United States Patent [19]

Zimmer

[11] Patent Number: 4,466,261
[45] Date of Patent: Aug. 21, 1984

[54] SECURITY APPARATUS

[76] Inventor: John C. Zimmer, P.O. Box 2235, New Iberia, La. 70560

[21] Appl. No.: 441,907

[22] Filed: Nov. 15, 1982

Related U.S. Application Data

[63] Continuation-in-part of Ser. No. 198,299, Oct. 20, 1980, Pat. No. 4,358,941.

[51] Int. Cl.³ ............................................. F16B 41/00
[52] U.S. Cl. ........................................ 70/229; 70/230
[58] Field of Search ................. 70/229, 230, 231, 232; 292/327; 411/209, 294, 214, 215, 910

[56] References Cited

U.S. PATENT DOCUMENTS

| | | | |
|---|---|---|---|
| 1,854,495 | 4/1932 | Van Sickel | 70/230 |
| 2,377,465 | 6/1945 | Turner | 70/230 |
| 4,358,941 | 11/1982 | Zimmer | 70/229 |

*Primary Examiner*—Robert L. Wolfe
*Attorney, Agent, or Firm*—Guy E. Matthews

[57] ABSTRACT

Disclosed is a security device which includes a cylindrical externally threaded member having formed therein a radial first hole and a threaded second hole formed coaxially with the threaded member and intersecting the first hole. A bar is insertable into the first hole to extend radially outwardly therefrom. The bar includes a notch which is alignable with the second hole when the bar is inserted into the first hole. The device includes a sleeve having a first internal portion engageable with the externally threaded member and a second internal portion. The sleeve is engageable with the bar for preventing rotation of the sleeve with respect to the threaded member. The device includes a key operable pick-resistant lock that includes a lock body that is non-rotatably engageable with the second internal portion of the sleeve and a key operable screw that is threadably engageable with the second hole to engage the notch and prevent the bar from being removed from the threaded member.

7 Claims, 7 Drawing Figures

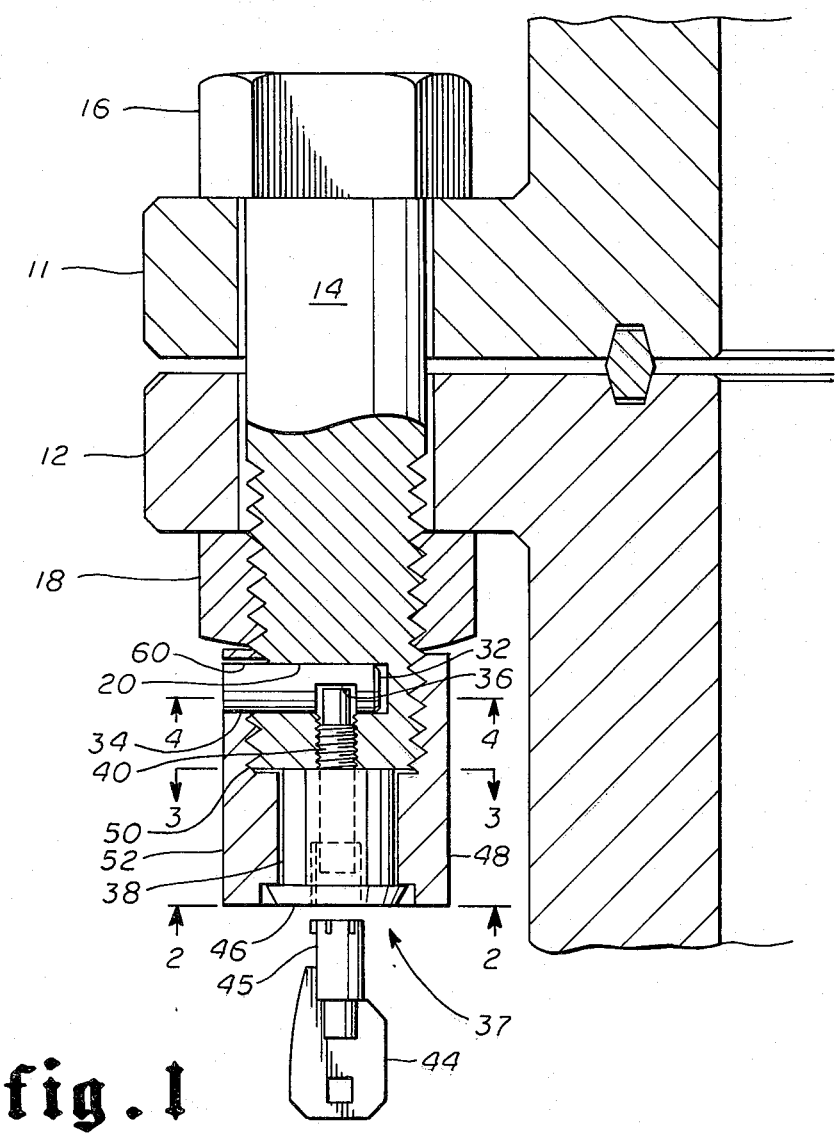
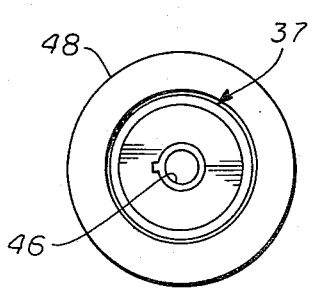 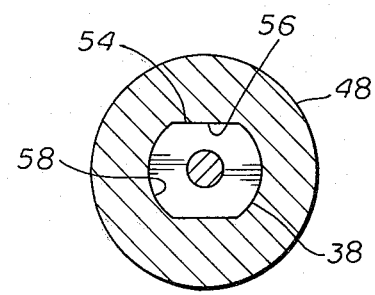 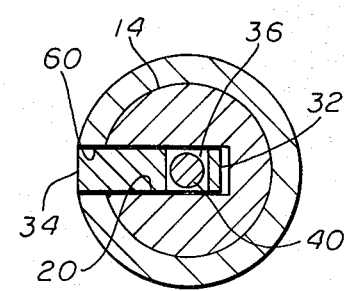

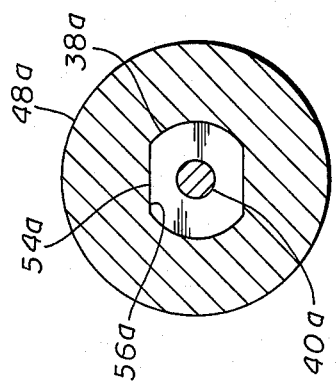
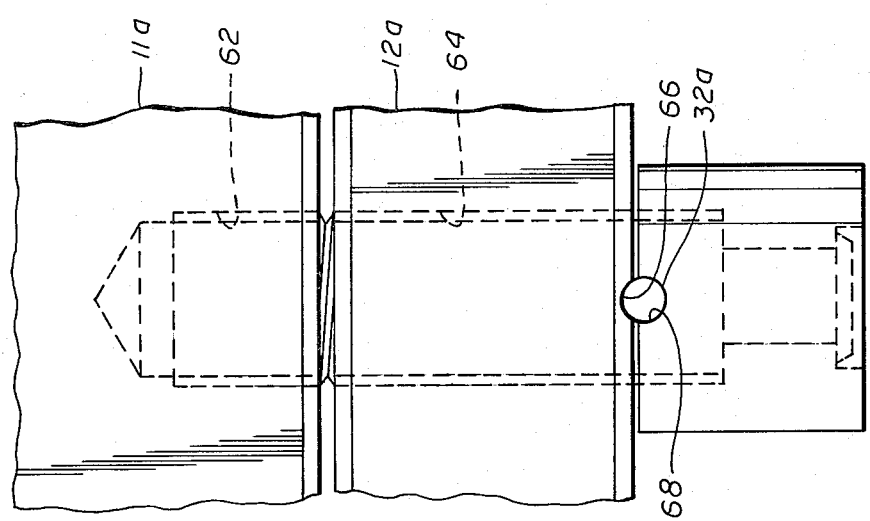
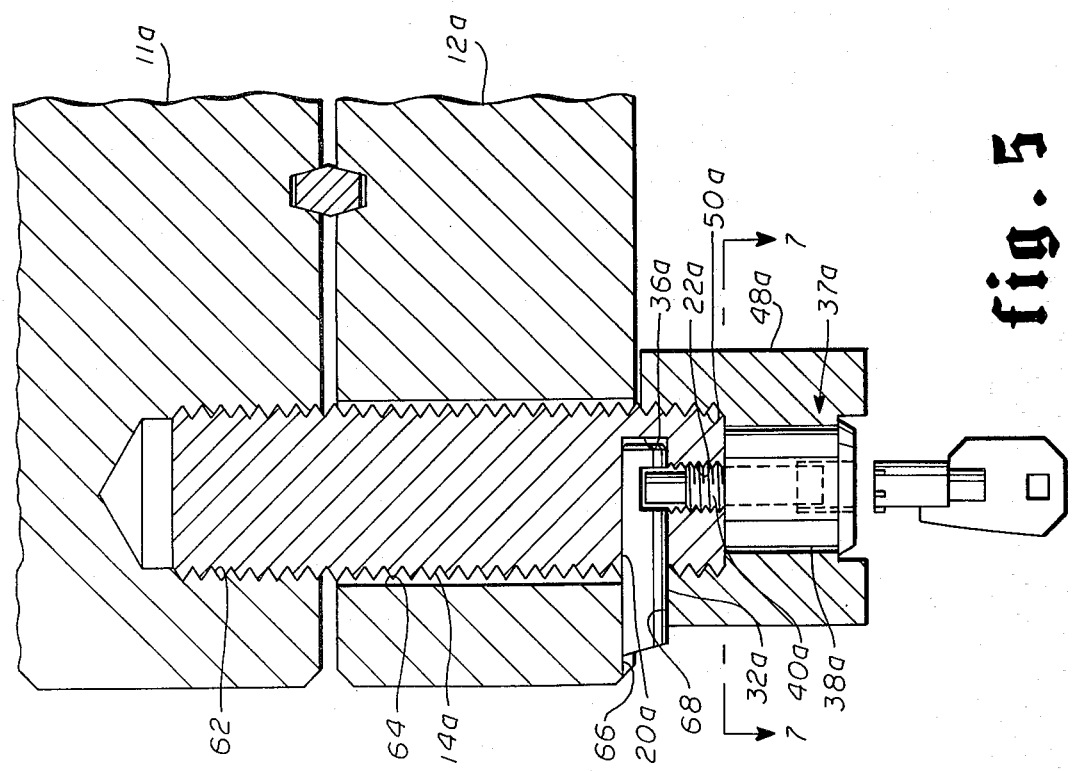

SECURITY APPARATUS

BACKGROUND OF THE INVENTION

This is a continuation in part of co-pending U.S. patent application Ser. No. 198,299, filed Oct. 20, 1980 and now U.S. Pat. No. 4,358,941.

A. FIELD OF THE INVENTION

This invention relates to security devices, and more particularly to devices for securing nuts on bolts and flange connections.

B. DESCRIPTION OF THE PRIOR ART

Producers of oil and gas wells are plagued with the problem of theft of production equipment from wellheads. Production equipment is assembled in the form of a christmas tree and when the christmas tree is assembled using conventional nuts and bolts, a thief can quickly disassemble the equipment with adjustable wrenches. Considering not only the cost of replacing stolen production equipment, but also the loss of production and labor required to reinstall the equipment, oil field equipment theft is extremely costly.

In the past, a number of locking devices have been suggested to eliminate the theft of oil field equipment or at least deter thieves. Such devices have included complicated structures requiring special tools for assembly and disassembly. The devices are effective in detering thieves because the thief normally does not have the specialized equipment necessary to disassemble the device. However, the prior art devices are not fool proof and may be disassembled if the thief has sufficient time or if he knows the arrangement of the device and has the special tools.

A more serious shortcoming of the devices of the prior art is that they are less effective for making up production equipment than are ordinary nuts and bolts. Also, even with the special tools, the prior devices are a nuisance to disassemble.

A further shortcoming of the devices of the prior art is that they are ineffective for protecting studded flange connections. In such a connection, the threaded member, rather than being a bolt with a head, is a stud, which is threaded into a blind hole in the one of the flanges. If a theft deterrent device of the prior art is applied to such a stud, torque can still be applied to the stud thereby to extract it from the blind hole and thereby disassemble the connection.

Accordingly, it is an object of the present invention to provide an apparatus for securing together equipment than can be assembled and disassembled quickly with conventional tools, but which, when locked, cannot be disassembled. It is the further object of the invention to provide an apparatus for securing studded flange connections.

SUMMARY OF THE INVENTION

Briefly stated, the foregoing and other objects of the present invention are accomplished by providing a threaded member or bolt having a first hole formed perpendicular to the axis of the threaded member or bolt, and a threaded second hole formed coaxially with the bolt or threaded member to intersect the first hole. A bar is provided that is insertable into the first hole such that when inserted, one end thereof extends radially outside the bolt. A pick-resistant lock is provided that includes a lock body and a key operable screw that is rotatable with respect to the lock body. The screw is threadably engageable with the second hole and the end of the screw engages a notch in the bar to prevent the removal of the bar from the first hole. A sleeve is provided that is engageable with the end of the bolt or threaded member adjacent hole. The sleeve is non-rotatably engageable with the lock body and engageable with the bar to prevent rotation of the sleeve with respect to the bolt.

BRIEF DESCRIPTION OF THE DRAWINGS

FIG. 1 is a partial sectional view of a preferred embodiment of the device of the present invention.

FIG. 2 is a view along line 2—2 of FIG. 1 showing an end view of the pick-resistant lock and sleeve.

FIG. 3 is a sectional view along line 3—3 of FIG. 1 showing the internal arrangement of the pick-resistant lock within the sleeve.

FIG. 4 is a sectional view along line 4—4 of FIG. 1 showing details of the arrangement of the bar, sleeve, bolt, and key-operable screw.

FIG. 5 is a side section view of an alternative embodiment of the present invention, which is adapted for securing a studded flange connection.

FIG. 6 is an elevation view of the embodiment of FIG. 5.

FIG. 7 is a sectional view along line 7—7 of FIG. 5 showing the arrangement of the lock body within the sleeve.

DESCRIPTION OF THE PREFERRED EMBODIMENT

Referring now to the drawings, and first to FIG. 1, the device of the present invention is shown securing a pair of flanges 11 and 12. The device includes a bolt 14 having a head 16 and a nut 18 threaded thereon to make up flanges 11 and 12. Head 16 and nut 18 are of conventional configuration and have a plurality of flat surfaces in order that they may be made up with ordinary wrenches.

Bolt 14 has formed therein a first hole 20. Hole 20 is formed by drilling, or the like, and extends into bolt 14 perpendicular to the axis thereof. Bolt 14 also has formed therein a threaded second hole 22. Second hole 22 is formed coaxially with bolt 14 and connects first hole 20 with the end of bolt 14.

First hole 20 is configured to receive a bar 32. Bar 32 is long enough such that one of its ends 34 extends radially outside bolt 14. Bar 32 is formed to define a notch 36 which registers with second hole 22 when bar 32 is received in first hole 20.

Bar 32 is retained in the first hole 20 by means of a pick-resistant lock, designated generally by the numeral 37. Pick-resistant locks are available generally and include a lock body 38 and a screw 40. Screw 40 is rotatable with respect to lock body 38 by means of a key 44. Key 44 has a cylindrical portion 45 that is insertable into a keyhole 46. Key 44 has a plurality of key structures that are adapted to mate with and operate a locking mechanism within lock body 38, shown generally in fantom in FIG. 1, to rotate screw 40. The locking mechanism includes key releasable lock structures.

Pick-resistant lock 37 is adapted for non-rotatable mounting to the end of bolt 14 by means of a sleeve 48. Sleeve 48 includes a threaded portion 50, which is adapted for threadable engagement with the end of bolt 14 and a second portion 52 which is adapted for non-rotatable engagement with lock body 38. As best shown in FIG. 3, lock body 38 includes at least one flat side 54, which is engageable with a flat surface 56 in the bore 58 of portion 52 of sleeve 48.

Sleeve 48 is non-rotatably mounted to the end of bolt 14 by means of a radial hole 60 in threaded portion 50 of sleeve 48 which is engageable with bar 32. When bar 32 is inserted through and engaged with first hole 20 of bolt 14 and hole 60 of sleeve 48, sleeve 48 cannot be rotated with respect to bolt 14. Bar 32 is retained in first hole 20 by the engagement of screw 40 with notch 36. When screw 40 is engaged with notch 36, bar 32 cannot be removed without key 44.

In operation, holes 20 and 22 are formed in bolt 14. Bolt 14 is then used to connect together flanges 11 and 12 by means of nut 18. Bolt 14 and nut 18 can be tightened to make up flanges 11 and 12 as tightly as possible for ordinary wrenches. After flanges 11 and 12 have been made up, sleeve 48 is threaded over the end of bolt 14 until hole 60 of sleeve 48 and first hole 20 of bolt 14 are aligned in registry with one another. Then, bar 32 is inserted into first hole 20 and hole 60 until notch 36 registers with second hole 22, whereupon pick-resistant lock 37 is inserted with screw 40 in second hole 22 and lock body in bore 58 of sleeve 48. Key 44 is then inserted into key 46 and rotated to advance screw 40 into hole 22, eventually to engage notch 36 of bar 32. When screw 40 is engaged with notch 36, key 44 is removed, thereby locking nut 18 onto bolt 14. If it is desired to disassemble flanges 11 and 12, key 44 is simply inserted into keyhole 46 and screw 40 is rotated to remove pick-resistant lock 37. After pick-resistant lock 37 has been removed, bar 32 and sleeve 48 are removed, whereupon nut 18 may be backed off with a conventional wrench.

Referring now to FIGS. 5-7, there is shown an alternative embodiment of the device of the present invention which is adapted for securing a studded flange connection. The studded flange connection includes a first flange 11a and a second flange 12a. First flange 11a includes a threaded blind hole 62 and second flange 12b includes a non-threaded hole 64. Studded flange connections of the type of flanges 11a and 12a are normally connected together by studs, which are simply elongated threaded members, and nuts. Studs do not include a head as do bolts. Rather, one end of the stud is threaded into a blind hole, as for example blind hole 62, and a nut is threaded to the other end of the stud. If conventional locknuts are used with studded flange connections, torque can be applied to the locknut to remove the stud from the blind hole. Thus, the stud can be removed from the connection without removing the locknut from the stud, thereby thwarting the locknut.

The theft deterrent studded flange connection of the present invention includes a stud or threaded member 14a which is adapted to pass through non-threaded hole 64 of flange 12a and thread into blind hole 62 of first flange 11a. Stud 14a is formed to include a radial first hole 20a perpendicular to the axis of stud 14a and a threaded second hole 22a coaxial with stud 14a. Second flange 12a is formed to include a generally semicircular flange recess 66 which extends radially from hole 64 to the edge or rim of flange 12a.

The studded flange connection of the present invention also includes a sleeve 48a which has an internally threaded portion 50a which is adapted to threadedly engage the end of stud 14a.

Sleeve 48a includes a generally semicircular saddle 68. Saddle 68 is positioned so as to register with flange recess 66 and first hole 28a when sleeve 48a is engaged with stud 14a. A bar 32a is provided for insertion through registered flange recess 66 and saddle 68 into first hole 20a of stud 14a. Bar 32a has sufficient length so as to extend radially outside stud 14a and engage both flange recess 66 and saddle 68. Thus, when bar 32a is so inserted, stud 14a, flanges 11a and 12a, and sleeve 48a are non-rotatable with respect to one another.

Bar 32 is retained by a pick-resistant lock 37a including a screw 40a which engages a notch 36a in bar 32a and a lock body 38a. As shown in FIG. 7, lock body 38a is non-rotatably mounted within sleeve 48a by a cooperative arrangement of flat surfaces, as for example surfaces 54a and 56a. Screw 40a is rotatable with respect to lock body 37a by means of key 44a which is adapted to engage and operate a lock mechanism shown in fantom within lock body 38a.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are taken as the presently preferred embodiments. Various changes may be made in the shape, size, and arrangement of the parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A security device which comprises:
   (a) a cylindrical bolt having formed therein a radial first hole substantially perpendicular to the axis of said bolt and a threaded second hole formed coaxially within said bolt and intersecting said first hole;
   (b) a nut threadably engageable with said bolt;
   (c) a bar insertable into said first hole, said bar having a length sufficient such that an end thereof extends radially outside said bolt when said bar is inserted in said first hole, said bar having a notch therein alignable with said second hole when said bar is inserted into said first hole;
   (d) a key-operable pick-resistant lock having a lock body with at least one flat side, and a key-operable screw including key releasable lock structures to rotate said screw with respect to said lock body, said screw being threadably engageable with said second hole to engage said notch of said bar; and
   (e) means for non-rotatably securing said lock to the end of said bolt adjacent said second hole, said non-rotatable securing means having a sleeve engageable with said end of said bolt adjacent said second hole, said sleeve comprising means for engaging said bar for preventing rotation of said sleeve with respect to said bolt, said engaging means defining a hole having a cross-section conformed to fit said lock body so as to prevent rotation of said lock body with respect to said sleeve.

2. The security device as claimed in claim 1, wherein: said sleeve includes an internally threaded portion threadably engageable with the end of said bolt.

3. The security device as claimed in claim 1, wherein: said sleeve includes a radial hole engageable with said bar thereby to define said means for preventing rotation of said sleeve with respect to said bolt.

4. The security device as claimed in claim 1, wherein:
said means for non-rotatably securing said lock body to said bolt includes a cylindrical sleeve having a first internal portion having a cross-section conformed to non-rotatably interfit with said lock body and a threaded second internal portion threadably engageable with said bolt, said sleeve including a means for engaging said bar for preventing rotation of said sleeve with respect to said bolt.

5. The security device as claimed in claim 4, wherein said means for preventing rotation of said sleeve with respect to said bolt is defined by a radial hole defined in said sleeve and engageable with said bar.

6. A tamper-resistant flange connection, which comprises:
a first flange including a threaded stud hole;
a second flange positioned a abuttment with said first flange and including a stud hole axially aligned with said first flange threaded stud hole, said second flange including a radial recess intersecting said second flange stud hole;
a threaded stud threadably engaged with said first flange threaded stud hole and extending through said second flange stud hole, said threaded stud including a first radial hole formed therein substantially perpendicular to the axis of said stud and registerable with said second flange radial recess, and a second threaded hole formed axially within said bolt and intersecting said first hole;
a sleeve having a threaded first internal portion threadably engaged with said stud and a second portion, said sleeve including a saddle portion registerable with said first hole of said stud;
a bar insertable into said first hole of said stud and having a length sufficient to extend radially outside said stud to engage said second flange recess and said sleeve saddle portion to prevent rotation therebetween, said bar having a notch therein alignable with said second hole of said stud when said bar is inserted in said first hole of said stud;
and a key-operable pick-resistant lock including a lock body non-rotatably engageable with said second portion of said sleeve and a key-operable screw including key releasable structures operable to rotate said screw with respect to said lock body, said screw being threadably engageable with said second hole of said stud to engage said notch of said bar.

7. A security device, which comprises:
a cylindrical externally threaded member having formed therein a radial first hole substantially perpendicular to the axis of the externally threaded member and a threaded second hole formed coaxial with said externally threaded member and intersecting said first hole;
a bar insertable into said first hole to extend radially outwardly therefrom, said bar including a notch therein alignable with said second hole when said bar is inserted into said first hole;
a sleeve having a first internal portion engageable with said externally threaded member and a second internal portion, said sleeve having means for engaging said bar for preventing rotation of said sleeve with respect to said externally threaded member;
and a key-operable pick-resistant lock including a lock body non-rotatably engageable with said second internal portion of said sleeve,
and a key-operable screw including key releasable lock structures operable to rotate said screw with respect to said body, said screw being threadably engageable with said second hole to engage said notch of said bar.

* * * * *